(12) United States Patent
Goodley

(10) Patent No.: US 6,183,643 B1
(45) Date of Patent: Feb. 6, 2001

(54) METHOD AND APPARATUS FOR DENITRIFICATION OF WATER

(75) Inventor: Mark D. Goodley, Escondido, CA (US)

(73) Assignee: AG Tech International, Inc., Escondido, CA (US)

(*) Notice: Under 35 U.S.C. 154(b), the term of this patent shall be extended for 0 days.

(21) Appl. No.: 09/256,696

(22) Filed: Feb. 24, 1999

(51) Int. Cl.⁷ ..................................................... C02F 3/30
(52) U.S. Cl. .......................... 210/605; 210/615; 210/630; 210/151; 210/262; 210/299; 210/512.1; 210/903
(58) Field of Search ..................................... 210/150, 151, 210/202, 220, 258, 262, 295, 299, 512.1, 605, 615, 618, 630, 903

(56) References Cited

U.S. PATENT DOCUMENTS

| | | | |
|---|---|---|---|
| 3,390,076 | * 6/1968 | Dubach | 210/512.1 |
| 4,008,159 | * 2/1977 | Besik | 210/903 |
| 4,043,936 | * 8/1977 | Francis et al. | 210/903 |
| 4,045,344 | 8/1977 | Yokota | 210/106 |
| 4,279,753 | 7/1981 | Nielson | 210/605 |
| 4,333,838 | 6/1982 | Ballnus | 210/614 |
| 4,351,729 | 9/1982 | Witt | 210/603 |
| 4,548,715 | 10/1985 | Stein | 210/614 |
| 4,693,827 | 9/1987 | Mordorski | 210/614 |
| 4,696,747 | 9/1987 | Verstraete | 210/605 |
| 4,765,892 | 8/1988 | Hulbert | 210/290 |
| 4,800,021 | * 1/1989 | Desbos | 210/605 |
| 4,859,341 | 8/1989 | Schreiber | 210/614 |
| 4,869,815 | * 9/1989 | Bernard et al. | 210/151 |
| 5,013,442 | 5/1991 | Davis | 210/614 |
| 5,076,928 | 12/1991 | Ballnus | 210/605 |
| 5,080,793 | 1/1992 | Urlings | 210/603 |
| 5,211,844 | * 5/1993 | Hattori et al. | 210/151 |
| 5,242,592 | 9/1993 | Ballnus | 210/605 |
| 5,338,447 | * 8/1994 | Vellinga | 210/512.1 |
| 5,342,522 | 8/1994 | Marsman | 210/605 |
| 5,482,630 | 1/1996 | Lee | 210/605 |
| 5,626,754 | 5/1997 | Ballnus | 210/605 |
| 5,681,471 | 10/1997 | Silverstein | 210/614 |
| 5,972,219 | * 10/1999 | Habets et al. | 210/605 |

* cited by examiner

Primary Examiner—Christopher Upton
(74) Attorney, Agent, or Firm—Calif Tervo

(57) ABSTRACT

Apparatus (10) for denitrification of a liquid, such as water, comprises a vertical processing tank (11) including: a bottom section (20) partially filled with activated sludge (22), bottom section (20) having a bottom (12) having a concave upward facing inner surface (13); a horizontal filter (40) spanning tank (11) above sludge (22); an anaerobic process section (50) including a denitrifying biomass section (54); and an oxidation section (60) including a diffuser (61). The method comprising the steps of: injecting impure water (90) into sludge (22) so as to travel helically upward to mix with sludge (22); filtering with filter (40); denitrifying with denitrifying biomass (54); and oxidizing the effluent water from anaerobic biomass (54) in oxidation section (60) including bubbling air from diffuser (63). Water (90) effluent from tank (11) is sterilized with an ozonation device (86).

27 Claims, 2 Drawing Sheets

METHOD AND APPARATUS FOR DENITRIFICATION OF WATER

FIELD OF THE INVENTION

This invention relates in general to denitrification of a liquid, and more specifically to a vertical, upward-flow denitrification tank.

BACKGROUND OF THE INVENTION

For at least 25 years, municipal wastewater treatment plants have been aware of the need to reduce or eliminate nitrogen compounds from their discharged effluent. Typically, they use a scheme of oxidizing ammonia to nitrate, then convert the nitrate to nitrogen gas. Microbiological processes are usually used for both steps of the process.

Since nitrate compounds are very soluble and mobile in water, they are found naturally only in arid climates. In the United States, though, nitrates are a common contaminant of groundwater in agricultural areas. Run-off from fertilized fields and from locations where animals, such as cattle, pigs and chickens, are raised in high concentration, such as dairy farms and animal feed operations, often contains enough nitrate to affect nearby water wells.

Installations to treat municipal wastes are complex systems. The several types of microorganisms employed to treat ammonia, nitrate, phosphate, and other classes of waste are generally sensitive to their environment, and do not thrive and perform their functions if conditions of Ph, oxidation or reduction potential, nutrient content, and other factors are not within the acceptable range.

Municipal sewage varies widely in these conditions. Sometimes, compounds toxic to microbial life appear suddenly. Sewage treatment plants, thus, must constantly monitor the incoming waste stream and the processes used for treatment. Technicians adjust the process conditions frequently to keep the microbial and other systems running efficiently. Failure to do so can result in release of insufficiently-treated effluent, or shutdown of the plant until the microorganisms are nursed back to health.

Municipal sewage treatment systems are made up of many tanks, covering a few acres of land. The piping, valves, access ports between tanks provide many opportunities for leaks and must be inspected daily, at least. Many of the systems require frequent backflushing and other maintenance of filters.

By comparison, agricultural well water in a given location has a simple composition, which does not fluctuate quickly. The impurities are relatively dilute and readily water-soluble.

Therefore, there has been a need for a simple nitrate removal system for rural agricultural areas that can have optimal operating conditions designed into it. Such a system should be robust, require little adjustment and maintenance, use as little electricity as possible, and be easy to transport to the site and install.

SUMMARY OF THE INVENTION

The present invention meets the need for a robust and simple nitrate treatment system for well water for agricultural use, such as drinking water for animals. In the preferred embodiment, the denitrification is accomplished within a single, vertical process tank with three process sections.

The bottom section, called the sludge section, contains an activated sludge in an anoxic, nearly anaerobic, condition. The water to be denitrified is injected into the bottom of the sludge section by nozzles, which cause the water to flow upward through the sludge in a helix. The helical flow allows slow and thorough mixing of the water to be treated with the sludge, without use of gas agitation or a stirring device. The preferred shape of the tank bottom is an inverse cone.

Water from the sludge section passes upward through a filter that retains particles in the range of 5 to 100 microns as it passes upward through a fabric filter. A flush valve just below the filter provides convenient backflushing by gravity of the filter.

An anaerobic denitrification process section, above the filter, contains an array of solid support strips coated with a film of denitrifying bacteria. These strips may contain the nutrients needed by the bacteria.

At the upper boundary of the anaerobic section, a grid of perforated pipes injects compressed air into the water. In the preferred embodiment, the water simultaneously flows upward through a biobed of aerobic bacteria on support strips similar to those below, in the anaerobic section. In this oxidation process section, the aerobic bacteria convert any odoriferous products of the anaerobic process, such as sulfides, to oxidized forms that are gaseous or non-noxious.

The treated water leaves the process tank through a pipe at the top. If it is desired to sterilize the water of introduced bacteria, the water may be directed to a final purification system. A standard biomass filter is used to remove clumps of bacteria that may have become dislodged from the support strips. A commercial ozonation device destroys living bacteria and renders the water sterile. Ultraviolet treatment could be instead, if desired. A slow sand filter, membrane cartridge, or bag filter may be used for filtration to about 2 microns.

Other features and many attendant advantages of the invention will become more apparent upon a reading of the following detailed description together with the drawings in which like reference numerals refer to like parts throughout.

DETAILED DESCRIPTION OF THE INVENTION

Figure 1:
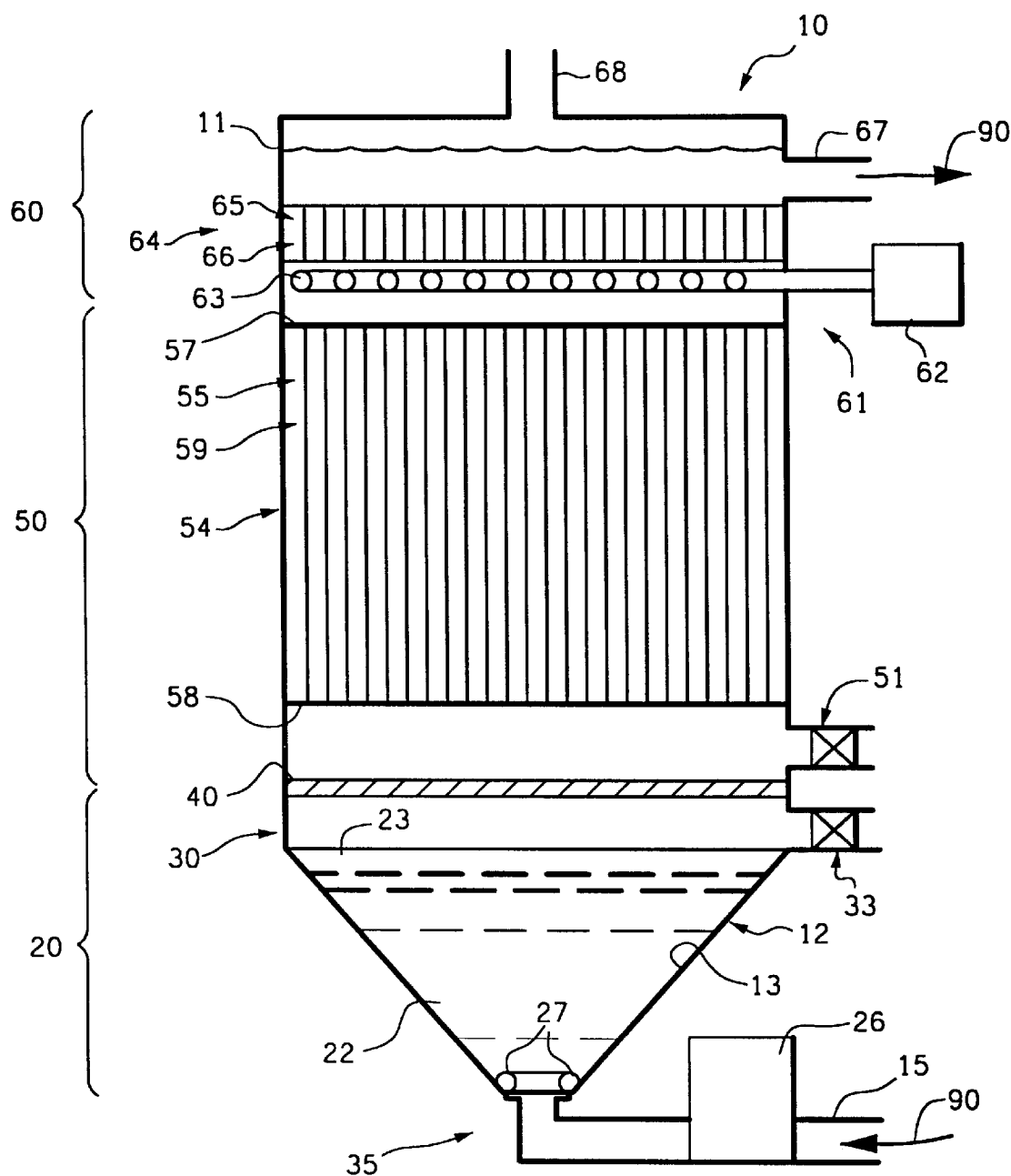
FIG. 1 is a diagrammatic view of a preferred embodiment of the denitrification apparatus for carrying out the process of the invention.

With reference now to the drawings, FIG. 1 is a diagrammatic view of a preferred embodiment of the denitrification apparatus 10 for carrying out the process of the invention. Apparatus 10 generally comprises a vertical vessel or tank 11 containing a bottom or sludge section 20, a filter 40, an anaerobic process section 50, and an oxidation section 60.

Tank 11 may be of conventional cylindrical design and made of coated steel or other suitable material. Tank bottom 12 has a concave upward facing inner surface 13. Preferably, inner surface 13 is circular in horizontal cross section, such as inverse conical surface 13 shown in the preferred embodiment. The conical bottom aids the helical flow of the influent water. A cylindrical tank discourages the sludge from lodging in sharp interior corners and putrefying.

Sludge section 20 is partially filled with activated sludge 22. Activated sludge 22 consists of microorganisms in an anoxic, nearly anaerobic, condition, capable of converting nitrates to molecular nitrogen and nitrous oxide gases, along with sufficient nutrients for their growth.

Influent liquid, such as water 90 containing nitrate salts, enters pipe 15.

Injection means 25 receives impure water 90 and injects it into bottom 12 of sludge section 20 such that the influent water 90 travels helically upward to mix with sludge 22. The helical flow allows slow and thorough mixing of the water to be treated with the sludge, without use of gas agitation or a stirring device.

In the embodiment shown, injection means 25 includes a pump 26 and nozzles 27. Pump 26 receives influent water 90 from pipe 15 and pressurizes it to a pressure dependant upon the size of the specific system, but typically in the range of 60 psi. Injection nozzles 27 are positioned and angled to inject water 90 on a chord line and sized so as to form a slow helical flow through the sludge, allowing sufficient contact time for the water to achieve a substantial decrease in nitrate concentration, typically several hours. The actual time required is calculated from the nitrate concentration of the influent groundwater and the output flow rate required. Injection pressure and tank dimensions can also be varied to attain the desired contact time. If influent water 90 already has sufficient head pressure, then pump 26 may not be required. Alternate injection means 25 could include an impeller (not shown) in bottom 12.

This sludge section is in a very anoxic, nearly anaerobic condition, and will hereafter be referred to as "anaerobic". As the water contacts the bacteria of the sludge, the bacteria convert nitrate in the water into molecular nitrogen. Most of the denitrification occurs in this section.

Sludge section 20 includes an upper end 30 above sludge 22 including an outlet 29 for egress of water 90 treated by sludge 22.

Horizontal filter 40 covers outlet 29 from sludge section 20. Horizontal filter 40 is a heavy polypropylene mesh fabric, which traps particles in the range of 5 to 100 microns. Since the flow impinges gently on the filter, and with a slight shearing motion, larger particles settle back into the bottom of the sludge section.

A backflush valve assembly 33 proximal filter 40, below filter 40, and above top 23 of sludge 22 selectively removes backflush directly below filter 40 from tank 11. If filter 40 needs to be backflushed, flush valve assembly 33 is opened and backflushing is accomplished by gravity flow. A hose or fixed pipe, not shown, may be attached to direct the backflush to the intake 15 of the system. Although a single backflush valve assembly 33 is shown, typically a plurality of backflush valve assemblies 33 are spaced around the periphery of tank 11.

Anaerobic process section 50 further denitrifies effluent received from filter 40.

Anaerobic process section 50 includes a denitrifying biomass section 54 including support surfaces, such as a plurality of support strips 55 having upper and lower ends supported and held in position between upper and lower support grids 57,58, for supporting bacteria 59.

Figure 2:
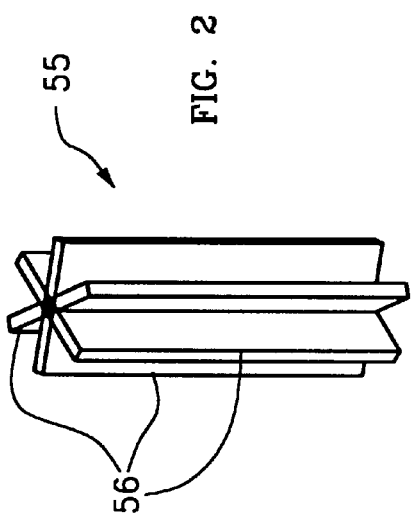
FIG. 2 is an partial enlarged perspective view of a support strip of FIG. 1.

FIG. 2 is an partial enlarged perspective view of a preferred embodiment of support strip 55 of FIG. 1. Strips 55 have six vanes 56 about the vertical axis. In the preferred embodiment strips 55 are plastic and are co-extruded with various nutrient materials, such as carbon, phosphorus, manganese, iron, molybdenum or cobalt, that support microbial activity. Bulk nutrients, such as mineral-containing clay or a carbon source such as a short-chain primary alcohol, may also be added, but have not been found to be generally necessary. The shape makes strips 55 rigid enough to be supported easily from the ends and to have a high specific surface area.

In the anaerobic process section, support strips 55 are covered with a film of denitrifying bacteria 59, which adhere well to strips 55. The combination of strips 55 and bacteria 59 is often called a biobed. This allows water 90 to be treated to flow past bacteria 59 without turbulent flow and in a reproducible manner, so that contact time can be established by flow rate only, and does not depend on the concentration of bacteria 59 in the system.

The denitrifying bacteria 59 convert the remaining nitrate in the water 90 to molecular nitrogen. A small amount of carbon dioxide may also be formed as a result of their metabolism.

Access to anaerobic biomass section 54 is provided by means such as a manhole, not shown, through which support strips 55 can be removed and replaced. Strips 55 will be replaced with new ones when the nutrients have been substantially consumed. If an a excessive growth of bacteria 59 occurs, causing the flow of water 90 to be impeded, strips 55 may be either replaced or cleaned and returned.

A biomass backflush valve assembly 51 proximal and below lower support grid 58 and above filter 40 can be opened to selectively removes backflush directly above filter 40 from tank 11. Although a single biomass backflush valve assembly 51 is shown, typically a plurality of biomass backflush valve assemblies 51 are spaced around the periphery of tank 11.

Oxidation section 60 includes an air diffuser assembly 61 and an aerobic biomass section 64. Oxidation section 60 receives effluent water 90 from anaerobic process section 50 and passes it through aerobic biomass section 64. Aerobic biomass 64 consists of aerobic bacteria for receiving oxygenated effluent from the air diffuser 63. These aerobic bacteria, supported on solid strips similarly to the anaerobic biomass, convert any odoriferous products of the anaerobic process, such as sulfides, to oxidized forms that are gaseous or non-noxious.

Air diffuser assembly 61 bubbles air through the received water 90 and aerobic biomass section 64. Air diffuser assembly 61 includes an air pump 62 and an air diffuser 63. Air diffuser 63, a grid of pipes underlying aerobic biomass section 64, expels air received from pump 62 as small bubbles through small nozzles or holes. The air bubbles provide an aerobic condition for the biomass and entrain dissolved product gases and help release them into the gas phase.

Treated water 90 exits outlet 67. A vent 68 above the top of water 90, vents the product gases, which include nitrogen and carbon dioxide. If any residual volatile organics are present, such as from bulk addition of a carbon source, the gases may be directed to an absorption or scrubbing device, not shown. Otherwise, the gases may be released to the atmosphere.

Figure 3:
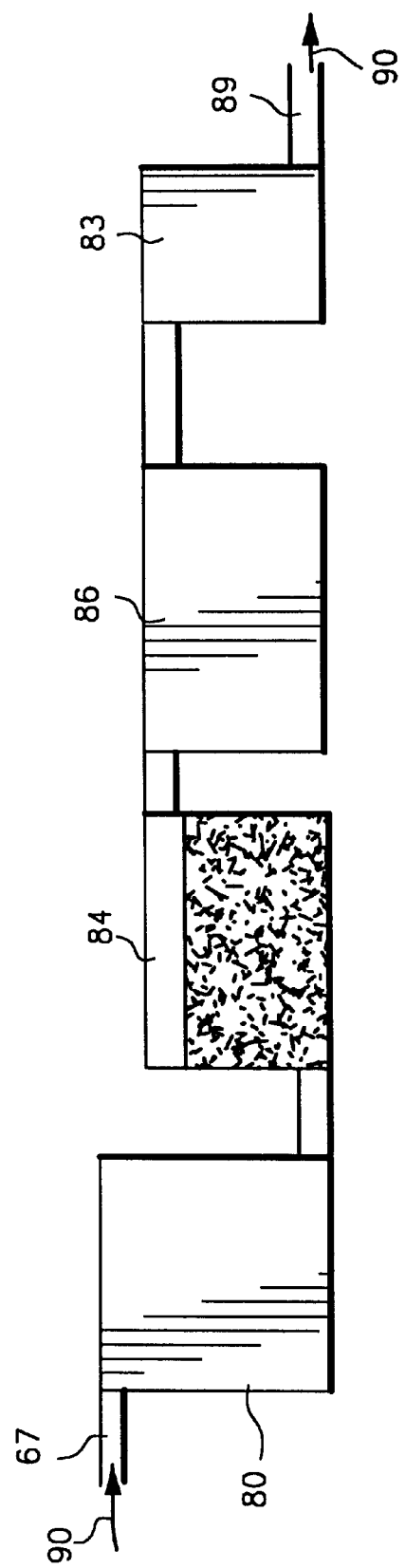
FIG. 3 is a schematic flow diagram view of sterilization apparatus downstream of FIG. 1.

FIG. 3 is a schematic flow diagram view of sterilization system downstream of FIG. 1. Treated water 90 may be further purified and made potable by directing it through the sterilization system of FIG. 3 including an ozonation device 86 for receiving treated water 90 and exposing it to ozone. Ozonation destroys living bacteria that may have escaped from the biobeds and renders the water sterile.

Other sterilization methods such as ultraviolet radiation or chlorination could also be used. Ozonation is preferred for this application because is an efficient disinfectant and decomposes spontaneously into oxygen, leaving no residue. The sterilization system may further include some combination of a standard biomass filter 80 to remove clumps of bacteria that have been dislodged from the support strips 55, bag filter 88, and slow sand filter 84, removing particles including bacteria to about 2 microns. Other particulates may include mineral scale produced by the ozonation. The sterilized water 90 is released through output pipe 89.

Having described the invention, it can be seen that it provides a very efficient device for the denitrification of well water in an agricultural setting.

All microbial operations occur within a single vessel, so that the effluent is clean and needs only a final polishing to make it potable. Residence time of the water in the various process zones is designed into the system dimensions and incoming pressure. The injection nozzles can also be customized to provide appropriate flow rates based on analysis of the actual water to be treated.

The nozzles introduce the water into the process tank in such a way that the water flows upward in a helical manner, which provides excellent mixing and contact with the activated sludge without the use of an electric stirrer or compressed air agitation.

Backflushing of the single screen is accomplished by opening a valve located just below it, so that gravity backflushes the screen without a pump for that purpose.

The single, vertical process tank occupies little land area. The auxiliary equipment for final sterilization and polishing of the water is tailored to the specific requirements of the site, so as to be no more complex than required.

The support strips for the biobeds contain bacterial nutrients, which diffuse out gradually. This reduces or eliminates the need to monitor the activity of the bacteria and provide additional nutrients. Access hatches are provided for replacement of the supports, when needed.

The aerobic biobed in the oxidation section of the apparatus odoriferous or foul-tasting products of the anaerobic phase. Air injected from the diffuser helps release dissolved gases from the water. The tank may be closed to the atmosphere, allowing the product gases—mainly nitrogen, possibly with carbon dioxide and nitrous oxide—and residual volatile organics added as carbon source, if any, to be collected and absorbed.

Although a particular embodiment of the invention has been illustrated and described, various changes may be made in the form, composition, construction, and arrangement of the parts without sacrificing any of its advantages. Therefore, it is to be understood that all matter herein is to be interpreted and illustrative and not in any limiting sense and it is intended to cover in the appended claims such modifications as come within the true spirit and scope of the invention.

I claim:

1. Apparatus for removal of impurities from liquid; said apparatus comprising:
   a sludge tank partially filled with activated sludge; said sludge tank having a bottom and an upper end including an outlet above said sludge for egress of liquid treated by said sludge;
   injection means for receiving the impure liquid and injecting the received impure liquid into said bottom of said sludge tank such that the influent liquid travels helically upward to mix with said sludge and exits said outlet; and
   a horizontal filter covering said outlet.

2. The apparatus of claim 1 wherein:
   said bottom has a concave upward facing inner surface.

3. The apparatus of claim 1 further including:
   a flush valve proximal said filter below said filter for selectively removing backflush below said filter from said tank.

4. The apparatus of claim 1 further including:
   a denitrifying biomass section including an outlet; and containing anaerobic bacteria; said biomass section for receiving effluent from said filter and for denitrifying the received effluent from said filter.

5. The apparatus of claim 4 wherein said denitrifying biomass section includes:
   support surfaces for said bacteria; said support surfaces containing nutrients that promote the growth and activity of said bacteria.

6. The apparatus of claim 4 wherein:
   said denitrifying biomass section is disposed above said sludge tank such that gravity facilitates backflush of said filter.

7. The apparatus of claim 4 further including: an oxidation section including:
   a bottom ingress for receiving liquid from said biomass section;
   an air diffuser for bubbling air through the received liquids.

8. The apparatus of claim 7 wherein:
   one of said sections is disposed above said sludge tank such that gravity facilitates backflush of said filter.

9. The apparatus of claim 7 wherein said oxidation section further includes:
   an aerobic biomass section containing aerobic bacteria; said biomass section for receiving oxygenated effluent from said diffuser and for oxidizing products of the denitrification reaction.

10. The apparatus of claim 9 further including:
    a sterilization system including an ozonation device for receiving effluent from said aerobic biomass section and exposing said received effluent to ozone.

11. Apparatus for denitrification of liquid; said apparatus comprising: a vertical processing tank including:
    a sludge section partially filled with activated sludge; said sludge including denitrifying microorganisms capable of converting nitrate into molecular nitrogen, oxygen or oxide gas; said sludge section;
    injection means for receiving the liquid and injecting the received liquid into said bottom of said sludge section such that the influent liquid travels helically upward to mix with said sludge;
    a horizontal filter spanning said tank above said sludge and defining said sludge section below; for retaining particulates while allowing the liquid to flow upward;
    a biomass section including an outlet; and containing anaerobic bacteria; said biomass section for receiving effluent from said filter and for denitrifying the received effluent from said filter; and
    an oxidation section including:
       a bottom ingress for receiving liquid from said biomass section; and
       an air diffuser for bubbling air through the received liquid.

12. The apparatus of claim 11 wherein:
    said bottom has a concave upward facing inner surface.

13. The apparatus of claim 11 further including:
    a flush valve proximal said filter below said filter for selectively removing backflush below said filter from said tank.

14. The apparatus of claim 11 wherein said biomass section includes:
   support surfaces for said bacteria; said support surfaces containing nutrients that promote the growth and activity of said bacteria.

15. The apparatus of claim 11 wherein said oxidation section further includes:
   an aerobic biomass section containing aerobic bacteria; said biomass section for receiving oxygenated effluent from said diffuser and for oxidizing by-products of the denitrification reaction.

16. A microbiological process for denitrification of water, consisting of the following steps:
   injecting the impure water into activated sludge in the bottom of a processing tank; the sludge including denitrifying microorganisms capable of converting nitrate into molecular nitrogen and oxygen or oxide gas; the water is injected so as to travel helically upward to mix with the sludge; and
   passing the effluent water from the sludge upward through a horizontal filter to remove particles.

17. The process of claim 16 further including passing the effluent water from the filter upward in contact, under anaerobic conditions, with a denitrifying biomass.

18. The process of claim 17 including supporting the biomass on solid support surfaces containing nutrients that promote the growth and activity of the biomass.

19. The process of claim 17 further including passing the effluent from the denitrifying biomass through an oxidation section, where air is injected into the effluent from a diffuser.

20. The process of claim 19 wherein the oxidation step further includes passing the effluent through an aerobic biomass.

21. The process of claim 20 further including sterilizing the water exiting the oxidation section with an ozonation device.

22. The process of claim 16 further including adding a carbon source to the activated sludge.

23. In a vertical processing tank including: a bottom section partially filled with activated sludge; said bottom section having a bottom having a concave upward facing inner surface; a horizontal filter spanning said tank above the sludge and defining said bottom section below; for retaining particulates while allowing the liquid to flow through; an anaerobic process section including a denitrifying biomass; said anaerobic process section disposed above said filter; an oxidation section including a diffuser; the oxidation section disposed above the anaerobic process section; a method for denitrification of liquid; said method comprising the steps of:
   injecting the impure water into the activated sludge in the bottom of the processing tank so as to travel helically upward to mix with the sludge;
   filtering the effluent water from the sludge upward through the filter;
   denitrifying the effluent water from the filter under anaerobic conditions with the denitrifying biomass;
   oxidizing the effluent water from the anaerobic biomass in the oxidation section including:
   bubbling air from the diffuser through the effluent water in the oxidation section.

24. The process of claim 23 wherein the oxidation section includes an oxidizing biomass;
   wherein the step of oxidation includes passing effluent through the aerobic biomass; and
   wherein the step of bubbling air includes bubbling air through the oxidizing biomass.

25. The process of claim 24 further including sterilizing the water exiting the oxidation section with an ozonation device.

26. The process of claim 23 including supporting the biomass on solid support surfaces containing nutrients that promote the growth and activity of the biomass.

27. The process of claim 23 further including adding a carbon source to the activated sludge.

* * * * *